US008882468B2

(12) United States Patent
Resh et al.

(10) Patent No.: US 8,882,468 B2
(45) Date of Patent: Nov. 11, 2014

(54) BLADE FAMILIES FOR TORQUE CONVERTERS

(75) Inventors: Michael Resh, Massillon, OH (US); Bhaskar Marathe, Copley, OH (US); Cem Ersahin, Copley, OH (US); Randy Keller, Polk, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 971 days.

(21) Appl. No.: 12/972,969

(22) Filed: Dec. 20, 2010

(65) Prior Publication Data

US 2011/0150662 A1 Jun. 23, 2011

Related U.S. Application Data

(60) Provisional application No. 61/288,591, filed on Dec. 21, 2009, provisional application No. 61/314,757, filed on Mar. 17, 2010.

(51) Int. Cl.
*F16D 33/18* (2006.01)
*F16H 41/28* (2006.01)
*F16H 41/26* (2006.01)

(52) U.S. Cl.
CPC ............... *F16H 41/26* (2013.01); *F16H 41/28* (2013.01)

USPC ....................................................... 416/197 C

(58) Field of Classification Search
USPC ............................... 416/197 C, 175, 180, 237
See application file for complete search history.

(56) References Cited

U.S. PATENT DOCUMENTS

| 3,037,459 | A | | 6/1962 | Nelden |
| 3,244,400 | A | * | 4/1966 | Saunders ................. 416/231 R |
| 3,426,535 | A | * | 2/1969 | Mlacker et al. ................. 60/366 |
| 5,706,656 | A | * | 1/1998 | Hinkel ............................. 60/345 |

* cited by examiner

*Primary Examiner* — Dwayne J White
(74) *Attorney, Agent, or Firm* — Simpson & Simpson, PLLC

(57) ABSTRACT

A blade family for torque converters with a first blade having a first shape and flow guiding surface and a second blade having a second shape and flow guiding surface. The first surface is different from the second surface and the first shape is the same as a portion of the second shape, or the second shape is the same as a portion of the second shape. In an example embodiment of the invention, at least one of the first or second blades includes holes or slots. In an example embodiment of the invention, the first blade includes more material than the second blade. The first and second blades may have respective mounting tabs, with the second blade having fewer mounting tabs than the first blade. Other example aspects of the present invention broadly comprise a torque converter with a plurality of first and/or second blades from the blade family.

11 Claims, 13 Drawing Sheets

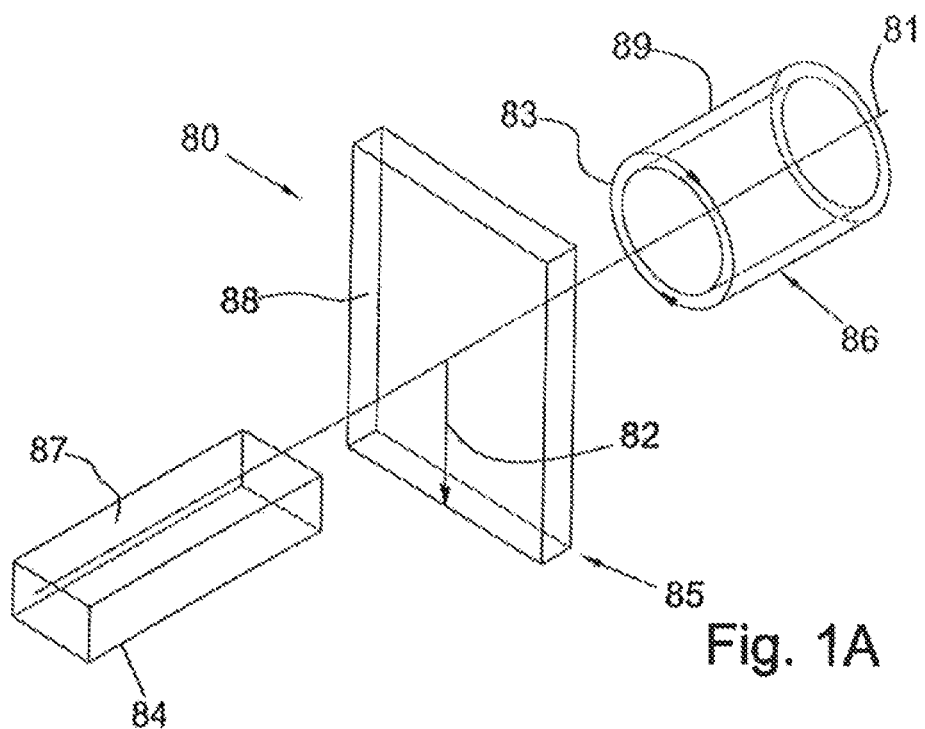
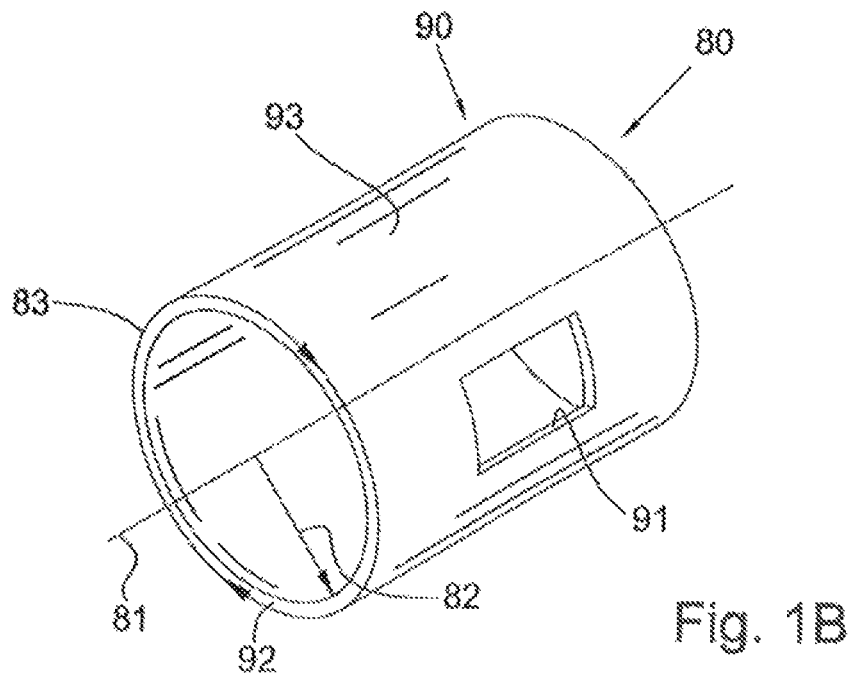

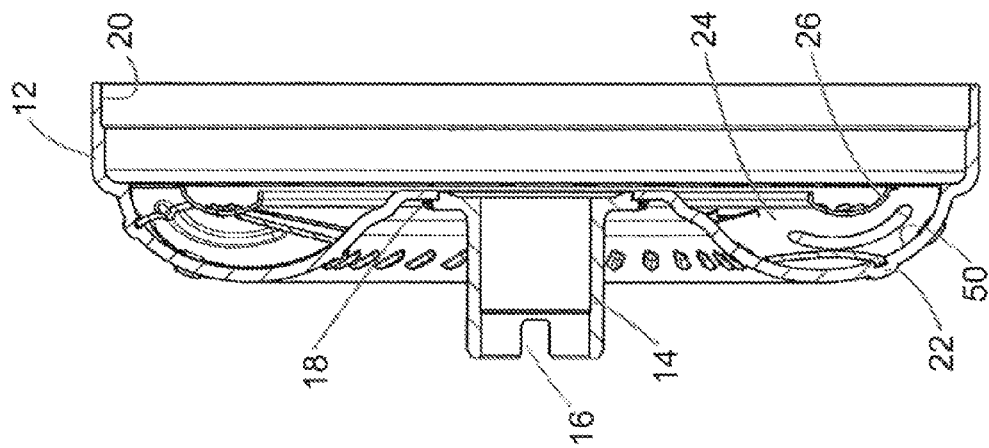
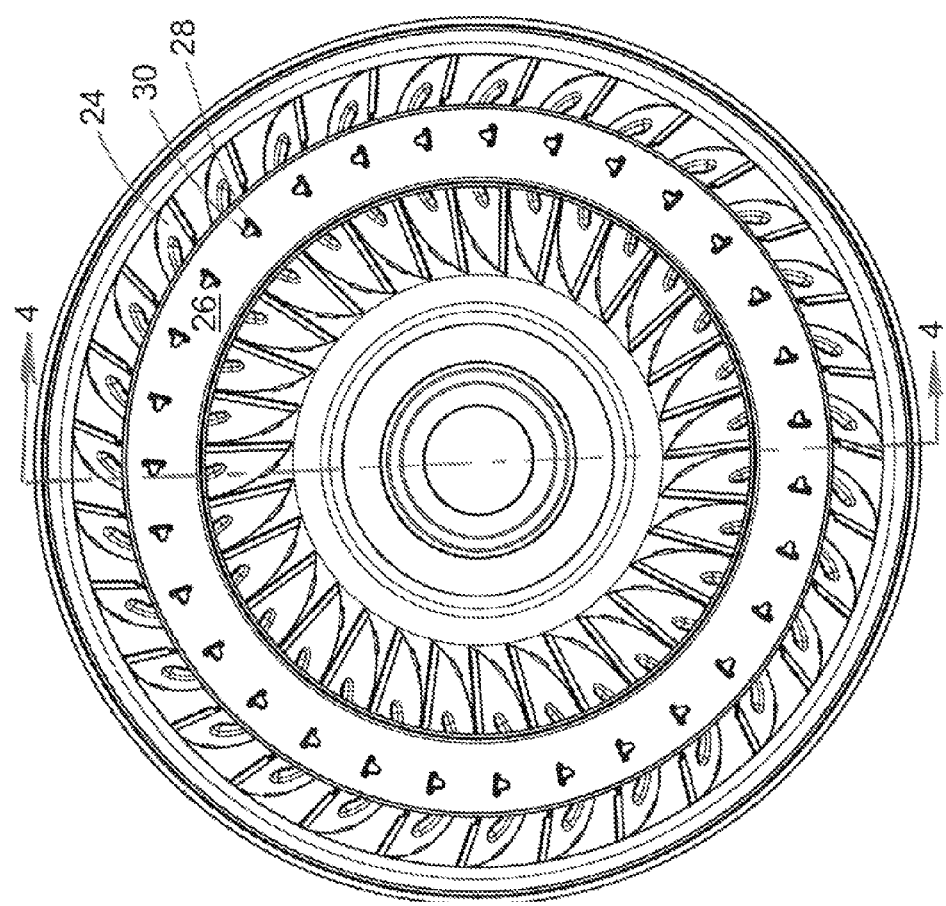

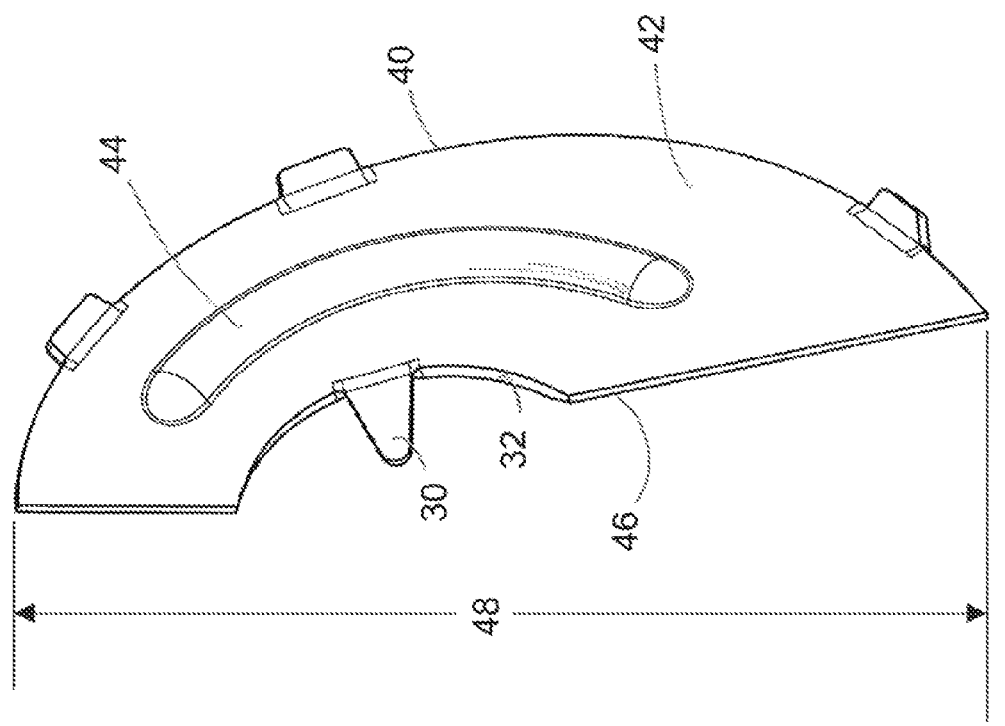
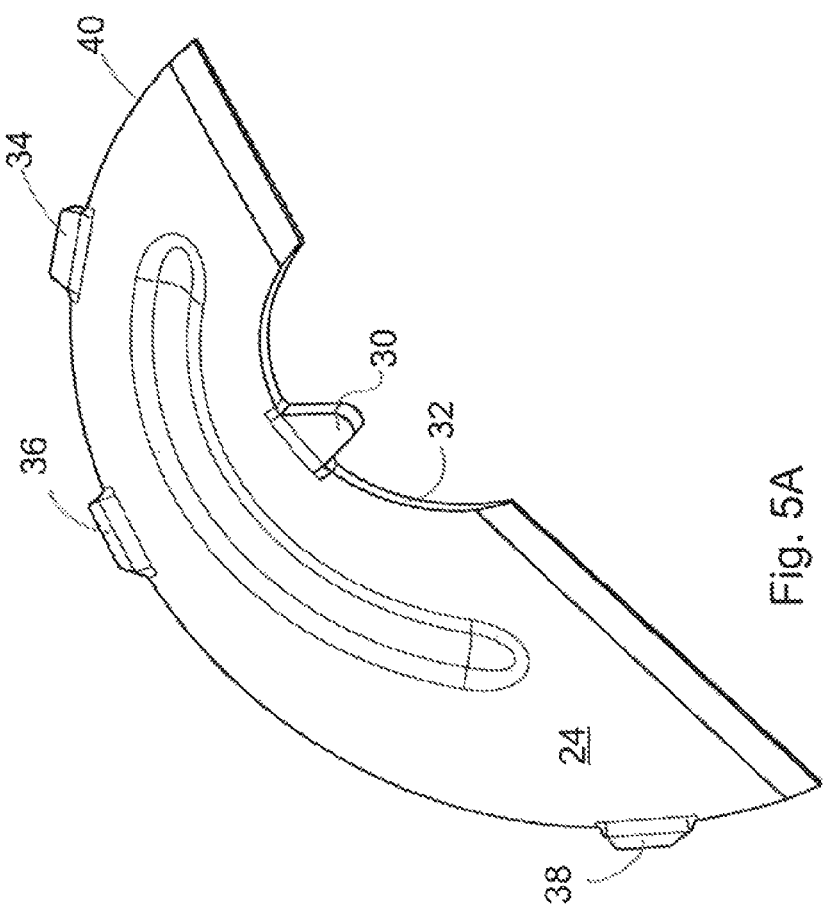

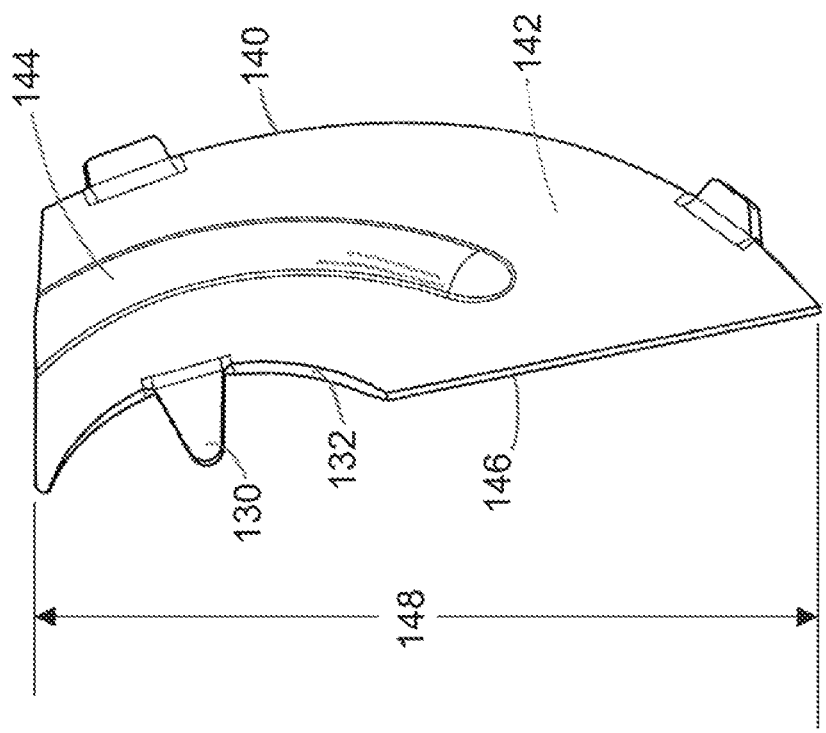
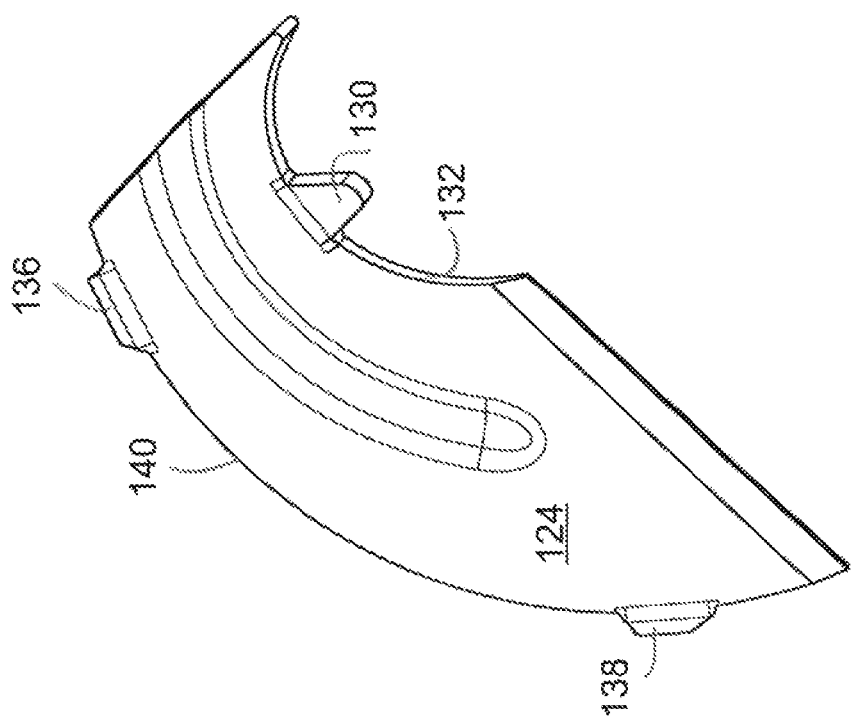

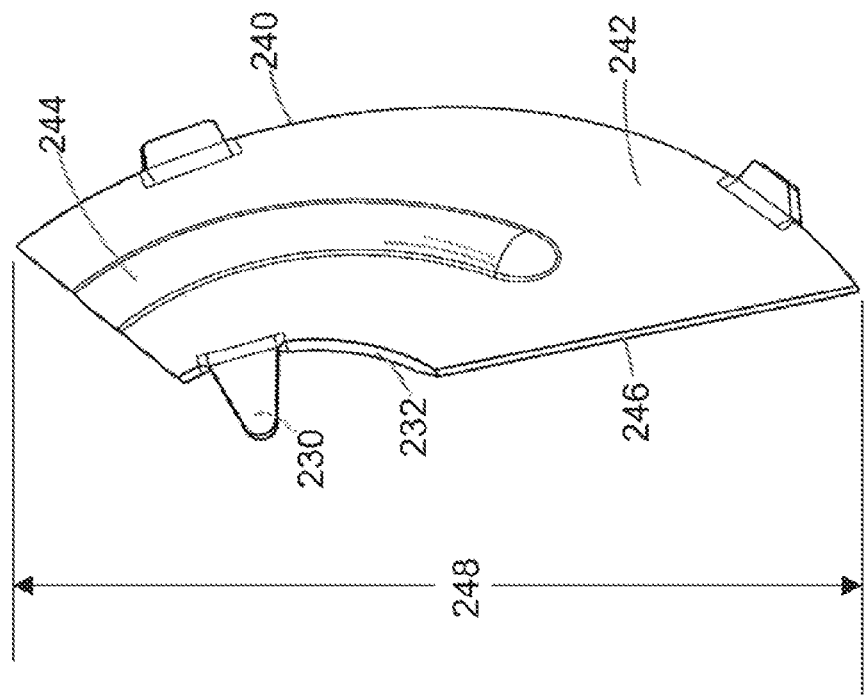
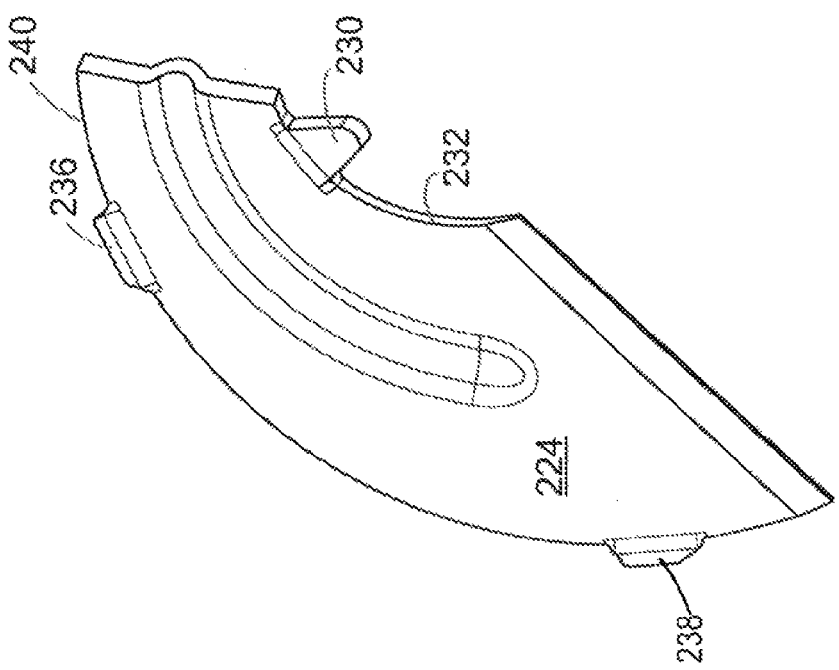
Fig. 7B
Fig. 7A

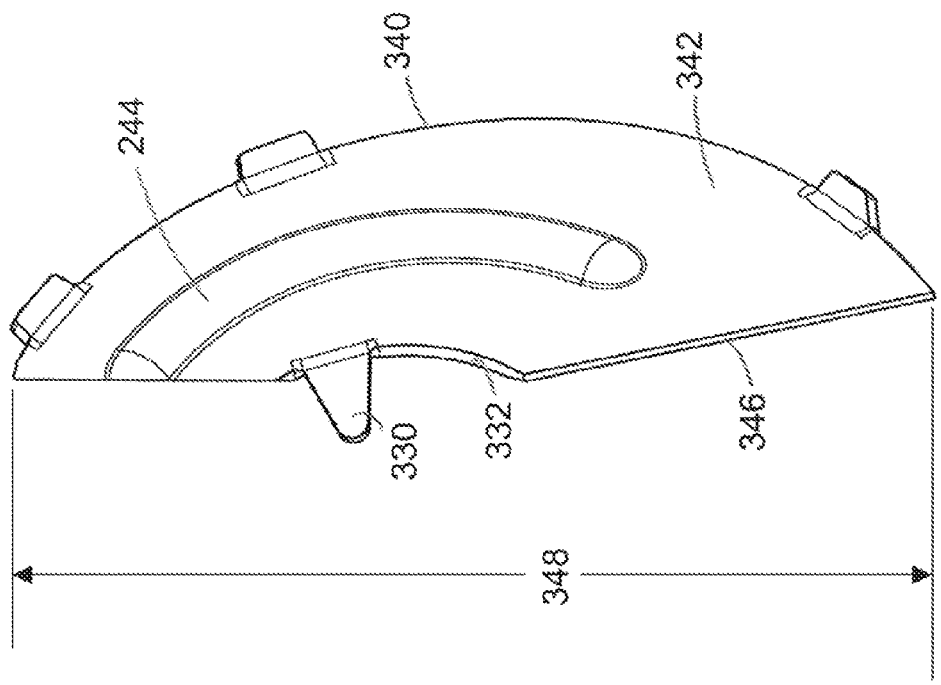
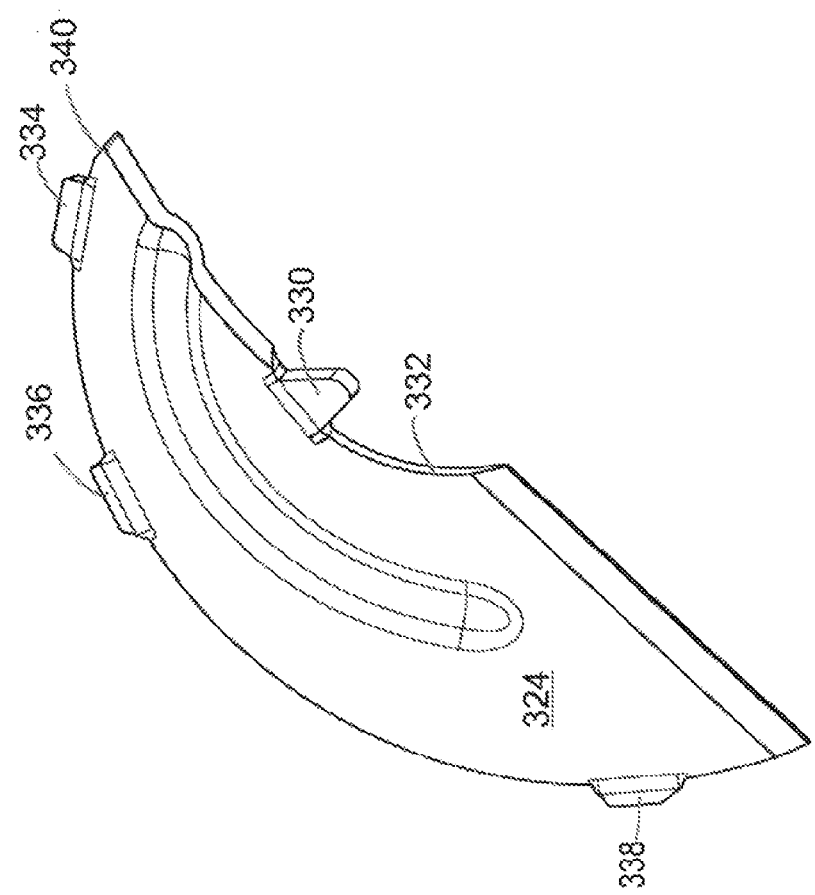

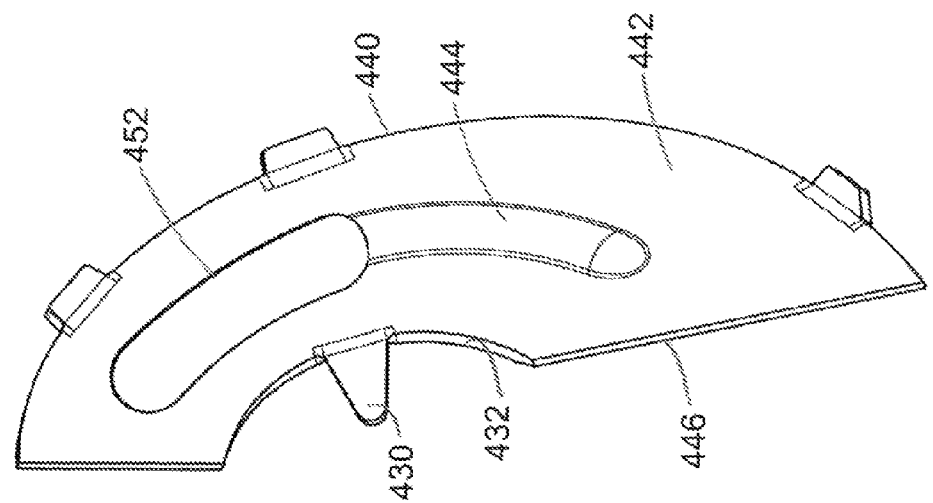
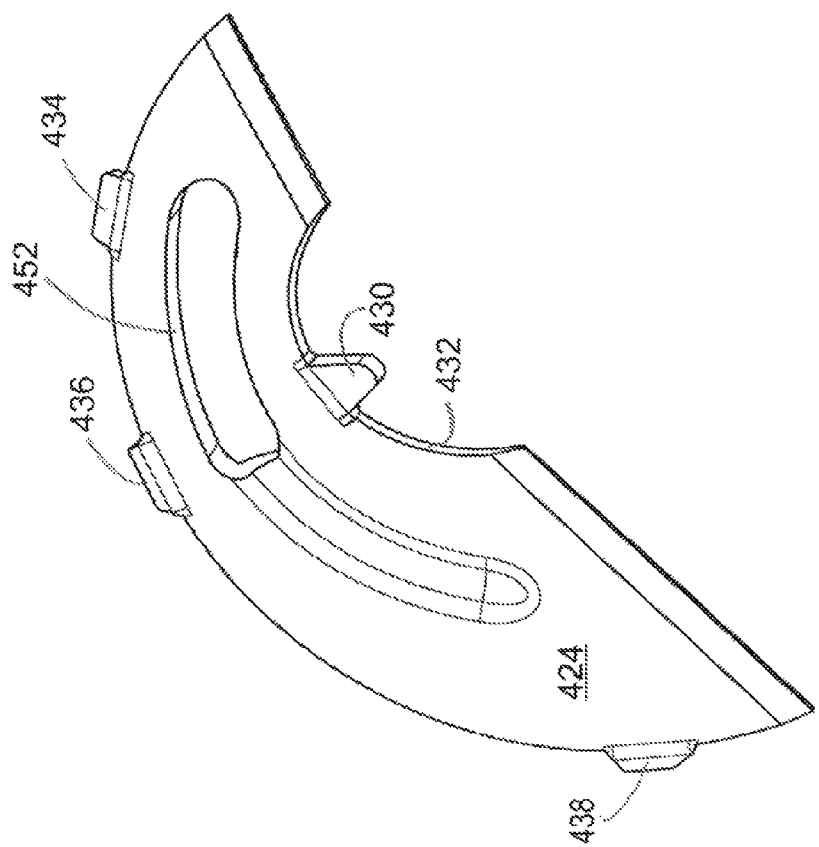

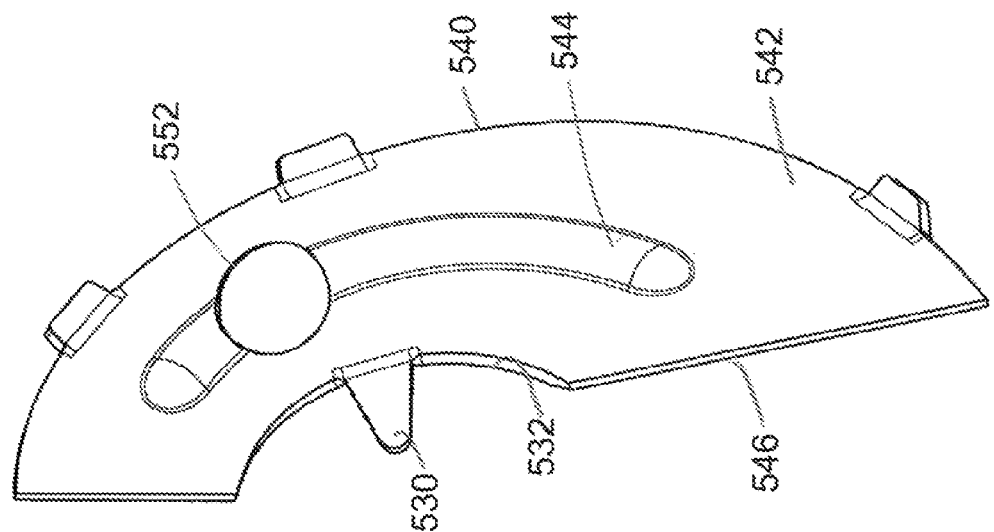
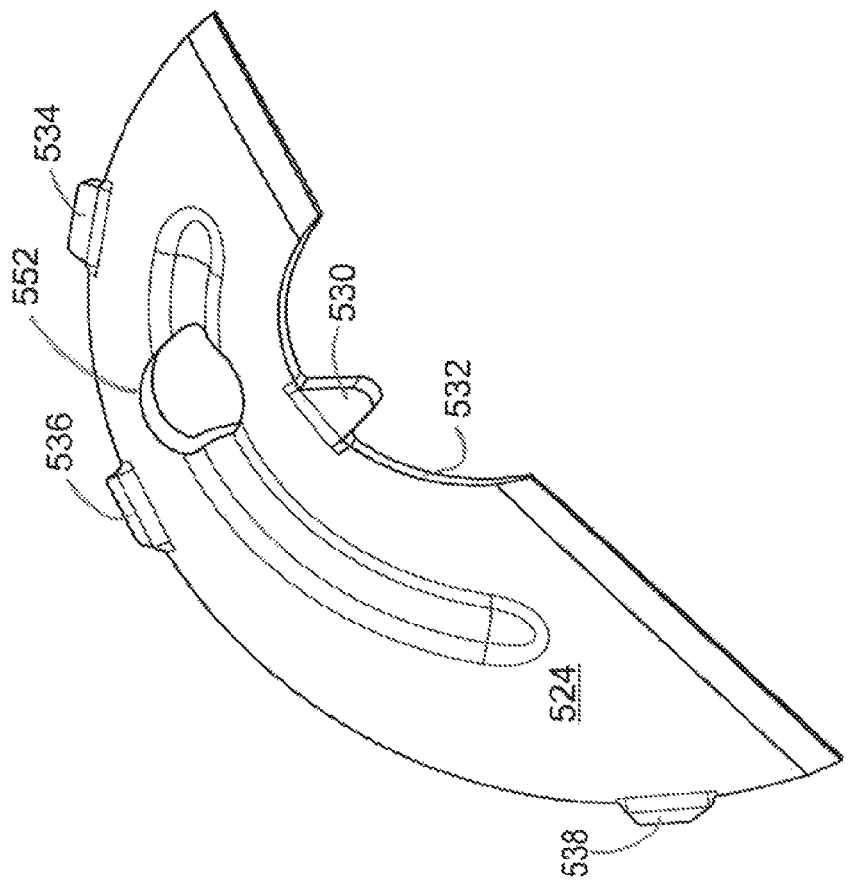

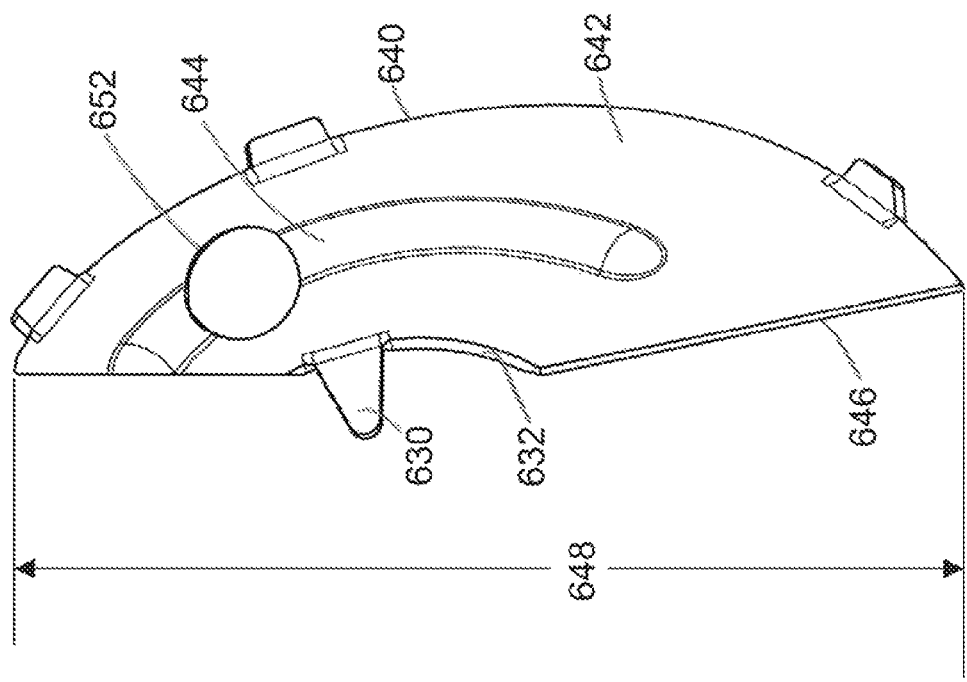
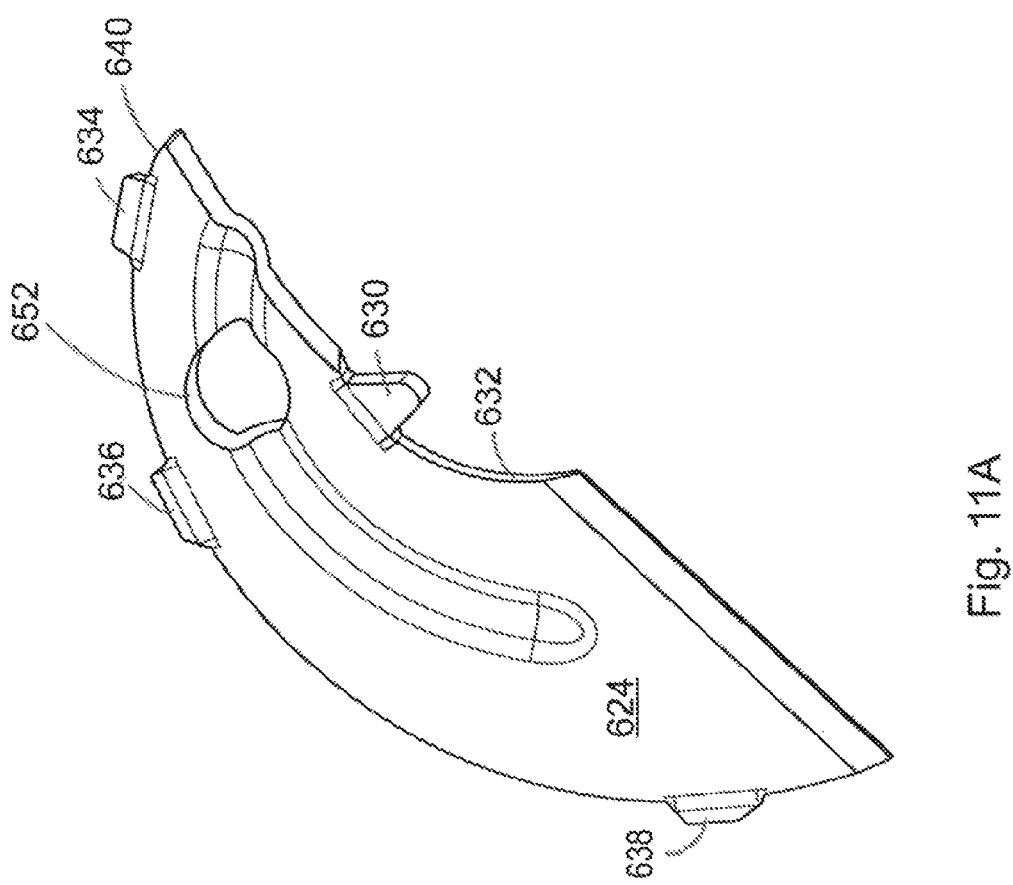

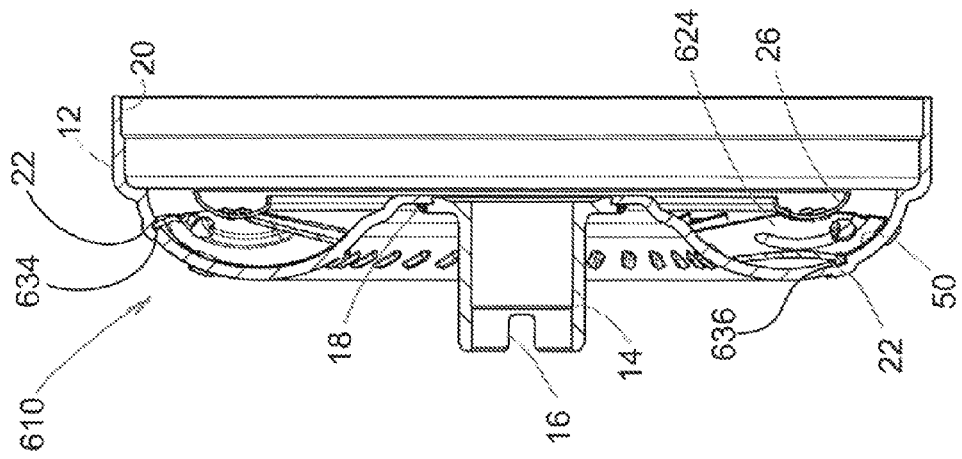
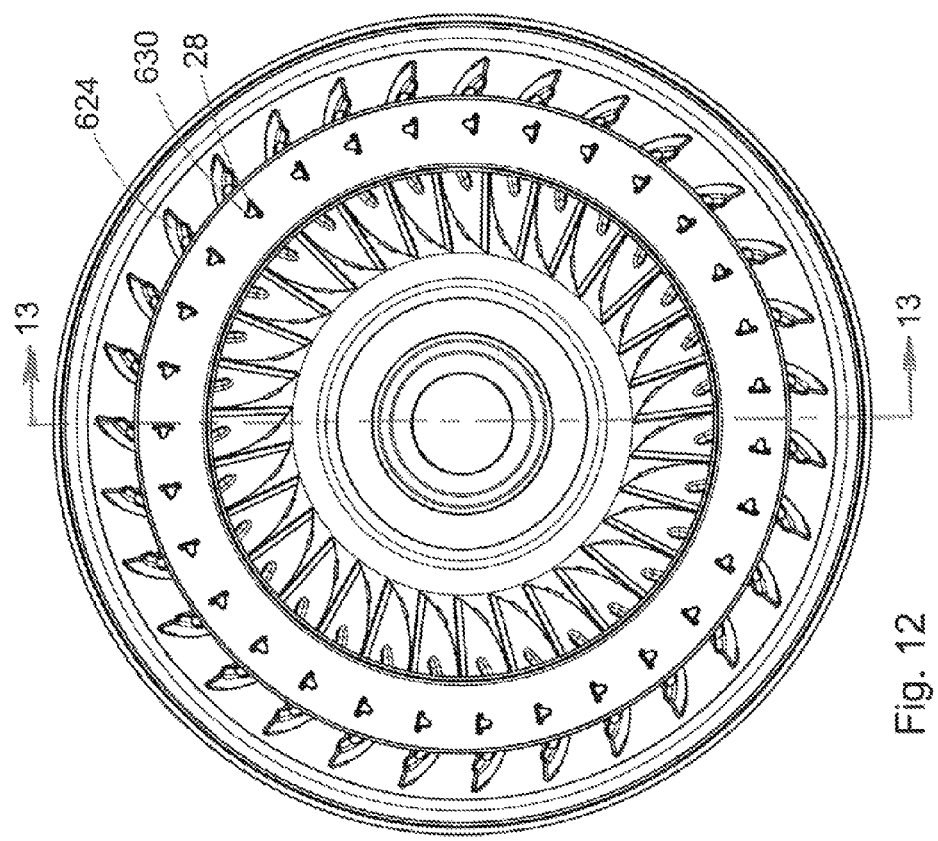

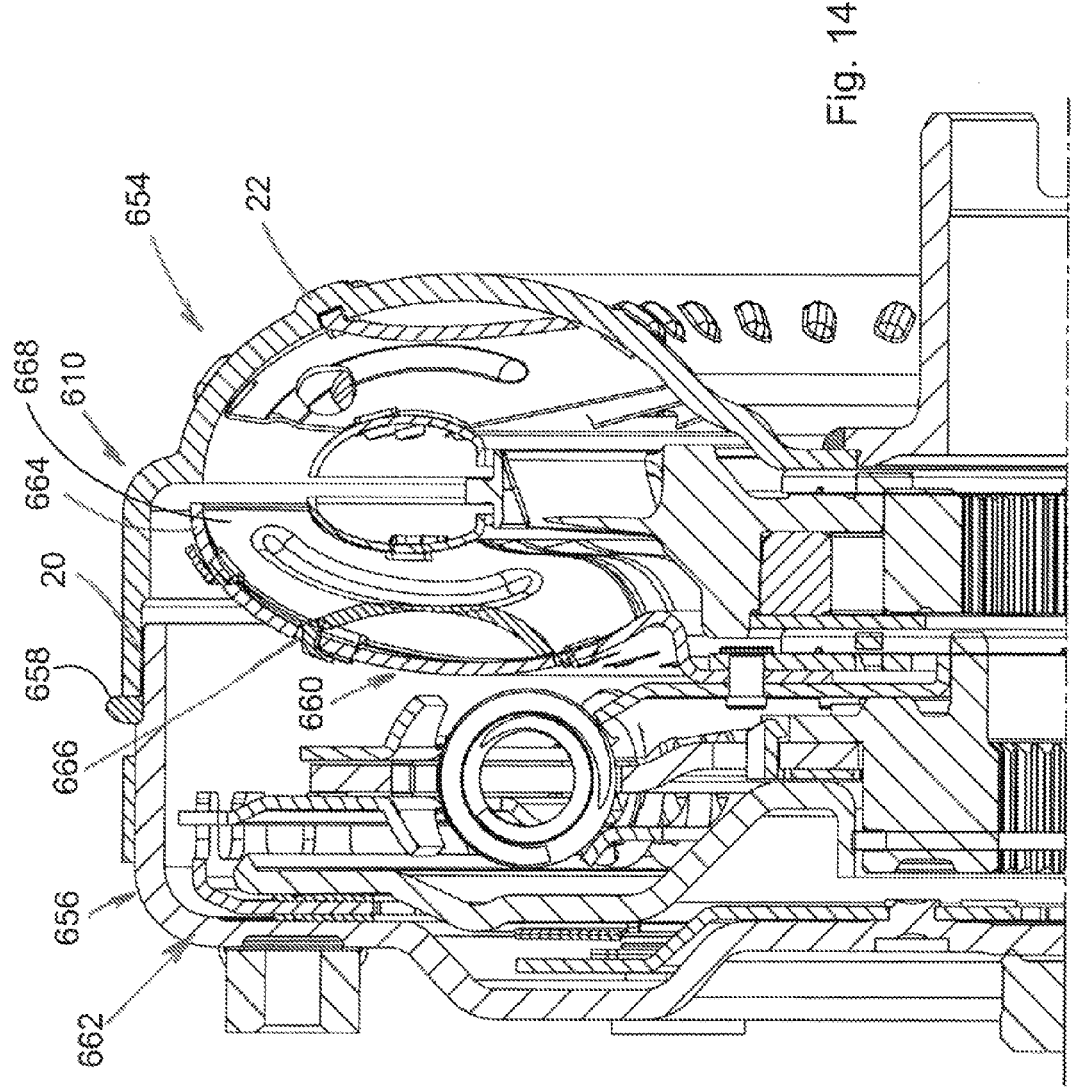

BLADE FAMILIES FOR TORQUE CONVERTERS

CROSS REFERENCE TO RELATED APPLICATIONS

This application claims the benefit of U.S. Provisional Application No. 61/288,591 filed Dec. 21, 2009 and U.S. Provisional Application No. 61/314,757 filed Mar. 17, 2010.

FIELD OF THE INVENTION

The invention relates generally to a torque converter, and more specifically to blade families for a torque converter.

BACKGROUND OF THE INVENTION

Blades with holes and various shapes and profiles are known. One example is shown in U.S. Pat. No. 3,037,459 assigned to American Radiator & Standard Sanitary Corporation. The '459 patent describes a balanced pressure rotor vane with spaced apertures to reduce the differential of pressure exerted on opposite sides of the vanes thereby reducing stresses exerted on the vanes.

BRIEF SUMMARY OF THE INVENTION

Example aspects of the present invention broadly comprise a blade family for torque converters with a first blade having a first shape and flow guiding surface and a second blade having a second shape and flow guiding surface. The first surface is different from the second surface and the first shape is the same as a portion of the second shape, or the second shape is the same as a portion of the first shape. In an example embodiment of the invention, at least one of the first or second blades includes holes or slots. In an example embodiment of the invention, the first blade includes more material than the second blade. The first and second blades may have respective mounting tabs, with the second blade having fewer mounting tabs than the first blade. Other example aspects of the present invention broadly comprise a torque converter with a plurality of first and/or second blades from the blade family.

Other example aspects of the present invention broadly comprise a blade for a torque converter having a substantially planar blank shape prior to forming and an at least partially curved form shape after forming. The form shape is substantially identical to a portion of a form shape for another blade and the blank shape is different than a substantially planar blank shape for the other blade. In an example embodiment of the invention, a performance characteristic of the torque converter is adjusted by using the blade or the other blade. In an example embodiment of the invention, a performance characteristic of the torque converter is adjusted by adding holes, slots, or cuts to the substantially planar blank shape.

Other example aspects of the invention broadly comprise a pair of blades for torque converters having a first blade with a first form shape and a second blade with a second form shape substantially identical to a portion of the first form shape. The first blade extends a first radial distance along an inner surface of a first shell and the second blade extends a second radial distance along an inner surface of a second shell. The first radial distance is less than the second radial distance.

Other example aspects of the invention broadly comprise a method of fabricating a blade for a torque converter including cutting a blank for the blade and forming the blade with a forming die. The forming die is a forming die for another blade and the blank is different than the blank for the other blade. In an example embodiment of the invention, cutting a blank for the blade includes cutting holes or slots. In an example embodiment of the invention, the blank for the blade includes less material than the blank for the other blade.

In some example embodiments of the invention, the blank and the other blank include mounting tabs, and the blank includes fewer mounting tabs than the other blank. In an example embodiment of the invention, the method includes installing the blade into a pump shell or turbine shell by installing the mounting tabs into corresponding indents or slots in the pump shell or turbine shell. In an example embodiment of the invention, the method includes installing a plurality of blades and other blades into a pump shell or turbine shell by installing the blade mounting tabs and the other blade mounting tabs into corresponding indents or slots in the pump or turbine shell. The blades and other blades may be members of a blade family.

BRIEF DESCRIPTION OF THE DRAWINGS

The nature and mode of operation of the present invention will now be more fully described in the following detailed description of the invention taken with the accompanying drawing figures, in which:

FIG. 1A is a perspective view of a cylindrical coordinate system demonstrating spatial terminology used in the present application;

FIG. 1B is a perspective view of an object in the cylindrical coordinate system of FIG. 1A demonstrating spatial terminology used in the present application;

FIG. 3 is a back view of the pump assembly of FIG. 2;

FIG. 4 is a section view of the pump assembly of FIG. 2 taken generally along line 4-4 in FIG. 3;

FIG. 5A is a perspective view of a blade for the pump assembly of FIG. 2;

FIG. 5B is a side view of the blade of FIG. 5A;

FIG. 6A is a perspective view of a cut blade for a torque converter according to an example aspect of the invention;

FIG. 6B is a side view of the blade of FIG. 6A;

FIG. 7A is a perspective view of a cut blade for a torque converter according to an example aspect of the invention;

FIG. 7B is a side view of the blade of FIG. 7A;

FIG. 8A is a perspective view of a cut blade for a torque converter according to an example aspect of the invention;

FIG. 8B is a side view of the blade of FIG. 8A;

FIG. 9A is a perspective view of a blade for a torque converter with a slot according to an example aspect of the invention;

FIG. 9B is a side view of the blade of FIG. 9A;

FIG. 10A is a perspective view of a blade for a torque converter with a hole according to an example aspect of the invention;

FIG. 10B is a side view of the blade of FIG. 10A;

FIG. 11A is a perspective view of a cut blade for a torque converter with a hole according to an example aspect of the invention;

FIG. 11B is a side view of the blade of FIG. 11A;

FIG. 12 is a back view of a torque converter pump assembly having cut blades with holes according to an example aspect of the invention;

FIG. 13 is a section view of the pump of FIG. 12 taken generally along line 13-13 in FIG. 12;

FIG. 14 is a partial section view of a torque converter assembly including the pump assembly of FIG. 12;

DETAILED DESCRIPTION OF THE INVENTION

Figure 2:
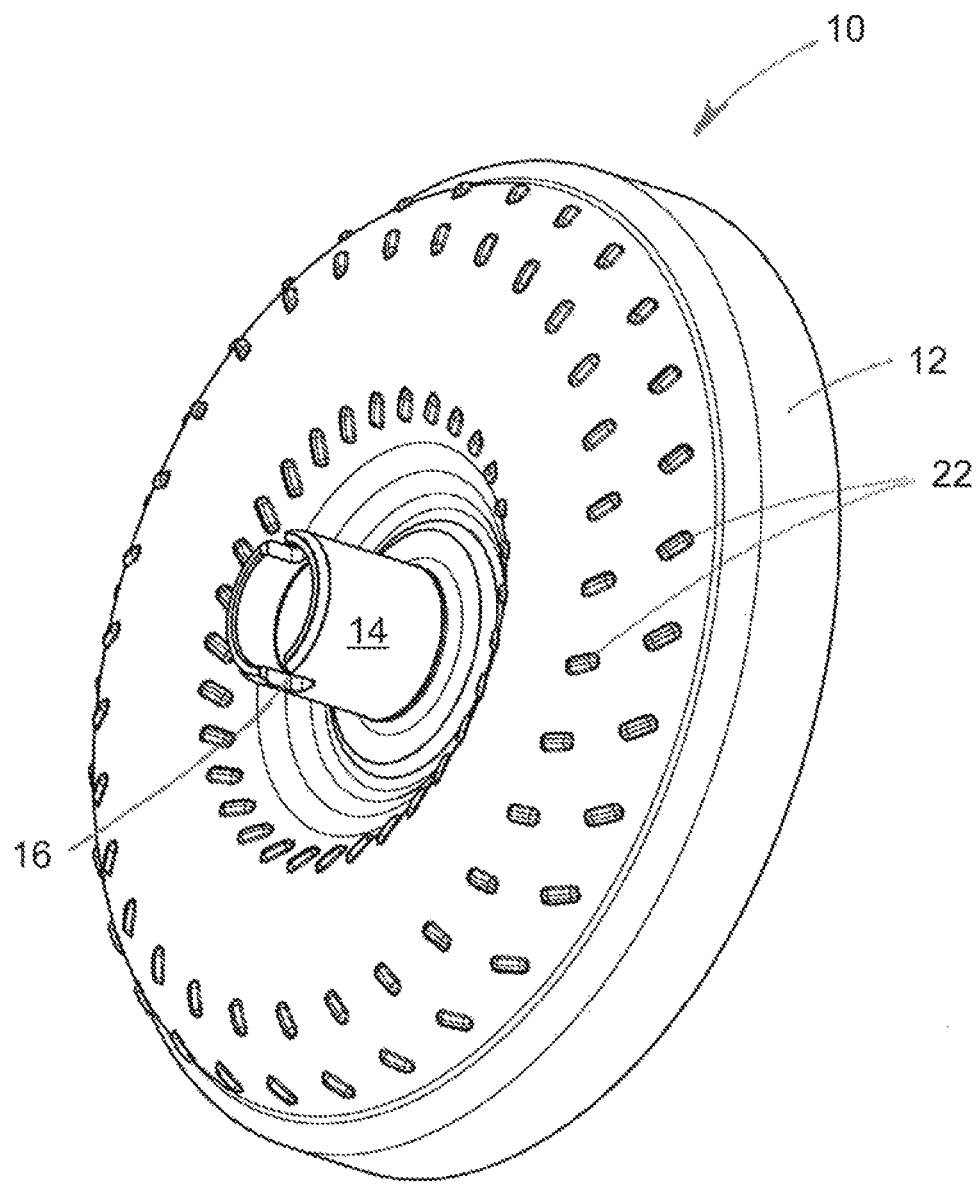
FIG. 2 is a perspective view of a torque converter pump assembly.

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

The following description is made with reference to FIGS. 2-4. FIG. 2 is a perspective view of torque converter pump assembly 10. FIG. 3 is a back view of the pump assembly of FIG. 2. FIG. 4 is a section view of the pump assembly of FIG. 2 taken generally along line 4-4 in FIG. 3. Torque converter pump assembly 10 includes shell 12 and hub 14. Hub 14 includes slots 16 arranged for driving connection with a pump assembly (not shown) of a transmission (not shown). Although slots 16 are shown, hub 14 may include other methods of driving the transmission pump. For example, hub 14 may have flats (not shown) for driving the pump. Hub 14 is fixedly secured to shell 12 by weld joint 18.

Shell 12 is arranged for driving engagement with a torque converter cover at interface area 20, as described infra. That is, shell 12 and the cover form a housing for the torque converter. Shell 12 further includes indents 22 for receiving pump blades 24. As described infra, blades 24 include tabs disclosed in indents 22. Pump assembly 10 includes core ring 26. Ring 26 includes slots 28 for receiving tabs 30 of blades 24. That is, tabs 30 extend through slots 28 and are bent, or tab-rolled, to secure blades 24 to ring 26. In an example embodiment of the invention, blades 24 may be brazed to shell 12 and/or core ring 26 for improved durability.

The following description is made with reference to FIGS. 5A and 5B. FIG. 5A is a perspective view of blade 24 for pump assembly 10. FIG. 5B is a side view of blade 24 of FIG. 5A. Blade 24 includes tab 30 extending from inside surface 32 and tabs 34, 36, and 38 extending from outside surface 40. Although a single tab 30 is shown, other numbers of tab 30 may be present on blade 24. For example, blade 24 may have two tabs 30.

Blade 24 includes surface 42. Surface 42 is substantially planar before forming. Through a forming process, surface 42 is shaped into a flow guiding surface. That is, after forming, surface 42 has a shape arranged to guide fluid through the pump assembly. In an example embodiment of the invention, the shape of surface 42 is at least partially curved after forming. Torque converter performance characteristics can be adjusted by modifying the shape of flow guiding surface 42.

Surface 42 may include rib 44. Rigidity of blade 24 is increased by rib 44. Although rib 44 extends outward from surface 42, rib 44 may extend in other directions. For example, rib 44 may extend inward from surface 42 and outward from surface 46, opposite surface 42.

Blade 24 may be modified to create a family of blades for torque converters. A family may be defined as a group or set of components that are related in some way, but which have or result in different performance characteristics. In an example embodiment of the invention, torque converters in a family of torque converters have shells with the same shapes and sizes, but different performance characteristics due to blade changes. Advantageously, additional tooling is not required in this example, since each member of the family uses the same shell design.

The family of blades is related in that each member shares the same form shape. The blades are manufacturable using the same forming die to create the curvature of the flow guiding surface, which is common for each blade in the family. In this example, different performance characteristics are achieved by altering the blank shape, or the shape created by the blanking die which forms the features of the blade other than the curvature of the flow guiding surface. Blank alterations may include cuts, holes, slots, or grooves, as exemplified throughout the drawings and description below. In this way, each blade in the family resembles the other members of the family, since they all have a common curvature for the flow guiding surface. Advantageously, the same form die and forming process can be used for all blades with only a change to the blanking die. This enables a variety of torque converters or blades to be manufactured without the need to create unnecessary dies or tooling.

The following description is made with reference to FIGS. 6A and 6B. FIG. 6A is a perspective view of blade 124 for a pump assembly. FIG. 6B is a side view of blade 124 of FIG. 6A. Blade 124 includes tab 130 extending from inside surface 132 and tabs 134 and 136 extending from outside surface 140. Although a single tab 130 is shown, other numbers of tab 130 may be present on blade 124. For example, blade 124 may have two tabs 130.

Blade 124 includes surface 142. Surface 142 is substantially planar before forming. Through a forming process, surface 142 is shaped into a flow guiding surface. That is, after forming, surface 142 has a shape arranged to guide fluid through the pump assembly. In an example embodiment of the invention, the shape of surface 142 is at least partially curved. Torque converter performance characteristics can be adjusted by modifying the size of flow guiding surface 142.

The following description is made with reference to FIGS. 5A-6B. In some example embodiments of the invention, blades 24 and 124 comprise at least a portion of a blade family for a torque converter. As can be seen from a comparison of the figures, surface 142 is different from surface 42. However, the figures also show that the shape of surface 142 is the same as the lower portion of surface 42. In an example embodiment of the invention, blade 24 includes more material than blade 124.

In an example embodiment of the invention, the form shape of surface 142 is substantially identical to a portion of the form shape of surface 42, but the blank shapes for the two surfaces are different. Stated another way, blades 24 and 124 are a pair of blades for torque converters with surfaces 42 and 142, respectively. The form shape of surface 142 is substantially identical to a portion of the form shape of surface 42. Blade 24 includes surface 40 extending radial distance 48 along inner surface 50 (FIG. 4) of shell 12. Blade 124 includes surface 140 extending radial distance 148 along an inner surface of a shell. In an example embodiment of the invention, radial distance 48 is larger than radial distance 148.

In an example embodiment of the invention, blade 24 includes more mounting tabs than blade 124. That is, blade 24 includes tabs 34, 36, and 38, while blade 124 only includes tabs 136 and 138. Blade 24 may include more tabs because the upper portion of blade 124 is missing when compared with blade 24.

The following description is made with reference to FIGS. 7A and 7B. FIG. 7A is a perspective view of blade 224 for a pump assembly. FIG. 7B is a side view of blade 224 of FIG. 7A. Blade 224 includes tab 230 extending from inside surface 232 and tabs 236 and 238 extending from outside surface 240. Although a single tab 230 is shown, other numbers of tab 230 may be present on blade 224. For example, blade 224 may have two tabs 230.

Blade 224 includes surface 242. Surface 242 is substantially planar before forming. Through a forming process, surface 242 is shaped into a flow guiding surface. That is, after forming, surface 242 has a shape arranged to guide fluid through the pump assembly. In an example embodiment of the invention, the shape of surface 242 is at least partially curved. Torque converter performance characteristics can be adjusted by modifying the size of flow guiding surface 242.

The following description is made with reference to FIGS. 5A, 5B, 7A, and 7B. In some example embodiments of the invention, blades 24 and 224 comprise at least a portion of a blade family for a torque converter. As can be seen from a comparison of the figures, surface 242 is different from surface 42. However, the figures also show that the shape of surface 242 is the same as the lower portion of surface 42. In an example embodiment of the invention, blade 24 includes more material than blade 224.

In an example embodiment of the invention, the form shape of surface 242 is substantially identical to a portion of the form shape of surface 42, but the blank shapes for the two surfaces are different. Stated another way, blades 24 and 224 are a pair of blades for torque converters with surfaces 42 and 242, respectively. The form shape of surface 242 is substantially identical to a portion of the form shape of surface 42. Blade 24 includes surface 40 extending radial distance 48 along inner surface 50 (FIG. 4) of shell 12. Blade 224 includes surface 240 extending radial distance 248 along an inner surface of a shell. In an example embodiment of the invention, radial distance 48 is larger than radial distance 248.

In an example embodiment of the invention, blade 24 includes more mounting tabs than blade 224. That is, blade 24 includes tabs 34, 36, and 38, while blade 224 only includes tabs 236 and 238. Blade 24 may include more tabs because the upper portion of blade 224 is missing when compared with blade 24.

The following description is made with reference to FIGS. 8A and 8B. FIG. 8A is a perspective view of blade 324 for a pump assembly. FIG. 8B is a side view of blade 324 of FIG. 8A. Blade 324 includes tab 330 extending from inside surface 332 and tabs 334, 336, and 338 extending from outside surface 340. Although a single tab 330 is shown, other numbers of tab 330 may be present on blade 324. For example, blade 324 may have two tabs 330.

Blade 324 includes surface 342. Surface 342 is substantially planar before forming. Through a forming process, surface 342 is shaped into a flow guiding surface. That is, after forming, surface 342 has a shape arranged to guide fluid through the pump assembly. In an example embodiment of the invention, the shape of surface 342 is at least partially curved. Torque converter performance characteristics can be adjusted by modifying the size of flow guiding surface 342.

The following description is made with reference to FIGS. 5A, 5B, 8A, and 8B. In some example embodiments of the invention, blades 24 and 324 comprise at least a portion of a blade family for a torque converter. As can be seen from a comparison of the figures, surface 342 is different from surface 42. However, the figures also show that the shape of surface 342 is the same as the lower portion of surface 42. In an example embodiment of the invention, blade 24 includes more material than blade 324.

In an example embodiment of the invention, the form shape of surface 342 is substantially identical to a portion of the form shape of surface 42, but the blank shapes for the two surfaces are different. Stated another way, blades 24 and 324 are a pair of blades for torque converters with surfaces 42 and 342, respectively. The form shape of surface 342 is substantially identical to a portion of the form shape of surface 42. Blade 24 includes surface 40 extending radial distance 48 along inner surface 50 (FIG. 4) of shell 12. Blade 324 includes surface 340 extending radial distance 348 along an inner surface of a shell. In an example embodiment of the invention, radial distance 48 is larger than radial distance 348.

The following description is made with reference to FIGS. 9A and 9B. FIG. 9A is a perspective view of blade 424 for a pump assembly. FIG. 9B is a side view of blade 424 of FIG. 9A. Blade 424 includes tab 430 extending from inside surface 432 and tabs 434, 436, and 438 extending from outside surface 440. Although a single tab 430 is shown, other numbers of tab 430 may be present on blade 424. For example, blade 424 may have two tabs 430.

Blade 424 includes surface 442. Surface 442 is substantially planar before forming. Through a forming process, surface 442 is shaped into a flow guiding surface. That is, after forming, surface 442 has a shape arranged to guide fluid through the pump assembly. In an example embodiment of the invention, the shape of surface 442 is at least partially curved. In an example embodiment of the invention, surface 442 includes slot 452. Torque converter performance characteristics can be adjusted by modifying the size and shape of slot 452.

The following description is made with reference to FIGS. 5A, 5B, 9A, and 9B. In some example embodiments of the invention, blades 24 and 424 comprise at least a portion of a blade family for a torque converter. As can be seen from a comparison of the figures, surface 442 is different from surface 42. That is, surface 442 includes slot 452 not present in surface 42. However, the figures also show that the shape of surface 442 is the same as a portion of surface 42. In an example embodiment of the invention, blade 24 includes more material than blade 424.

The following description is made with reference to FIGS. 10A and 10B. FIG. 10A is a perspective view of blade 524 for a pump assembly. FIG. 10B is a side view of blade 524 of FIG. 10A. Blade 524 includes tab 530 extending from inside surface 532 and tabs 534, 536, and 538 extending from outside surface 540. Although a single tab 530 is shown, other numbers of tab 530 may be present on blade 524. For example, blade 524 may have two tabs 530.

Blade 524 includes surface 542. Surface 542 is substantially planar before forming. Through a forming process, surface 542 is shaped into a flow guiding surface. That is, after forming, surface 542 has a shape arranged to guide fluid through the pump assembly. In an example embodiment of the invention, the shape of surface 542 is at least partially curved. In an example embodiment of the invention, surface 542 includes hole 552. Torque converter performance characteristics can be adjusted by modifying the size and shape of hole 552.

The following description is made with reference to FIGS. 5A, 5B, 10A, and 10B. In some example embodiments of the invention, blades 24 and 524 comprise at least a portion of a blade family for a torque converter. As can be seen from a comparison of the figures, surface 542 is different from surface 42. That is, surface 542 includes hole 552 not present in surface 42. However, the figures also show that the shape of surface 542 is the same as a portion of surface 42. In an example embodiment of the invention, blade 24 includes more material than blade 524.

The following description is made with reference to FIGS. 11A and 11B. FIG. 11A is a perspective view of blade 624 for a pump assembly. FIG. 11B is a side view of blade 624 of FIG. 11A. Blade 624 includes tab 630 extending from inside surface 632 and tabs 634, 636, and 638 extending from outside surface 640. Although a single tab 630 is shown, other numbers of tab 630 may be present on blade 624. For example, blade 624 may have two tabs 630.

Blade 624 includes surface 642. Surface 642 is substantially planar before forming. Through a forming process, surface 642 is shaped into a flow guiding surface. That is, after forming, surface 642 has a shape arranged to guide fluid through the pump assembly. In an example embodiment of the invention, the shape of surface 642 is at least partially curved. In an example embodiment of the invention, surface 642 includes hole 652. Torque converter performance characteristics can be adjusted by modifying the size of flow guiding surface 642 and/or hole 652.

The following description is made with reference to FIGS. 5A, 5B, 11A, and 11B. In some example embodiments of the invention, blades 24 and 624 comprise at least a portion of a blade family for a torque converter. As can be seen from a comparison of the figures, surface 642 is different from surface 42 and includes hole 652 not present in surface 42. However, the figures also show that the shape of surface 642 is the same as the lower portion of surface 42. In an example embodiment of the invention, blade 24 includes more material than blade 624.

In an example embodiment of the invention, the form shape of surface 642 is substantially identical to a portion of the form shape of surface 42, but the blank shapes for the two surfaces are different. Stated another way, blades 24 and 624 are a pair of blades for torque converters with surfaces 42 and 642, respectively. The form shape of surface 642 is substantially identical to a portion of the form shape of surface 42. Blade 24 includes surface 40 extending radial distance 48 along inner surface 50 (FIG. 4) of shell 12. Blade 624 includes surface 640 extending radial distance 648 along an inner surface of a shell. In an example embodiment of the invention, radial distance 48 is larger than radial distance 648.

The following description is made with reference to FIGS. 12-13. FIG. 12 is a back view of torque converter pump assembly 610 with blades 624 according to an example aspect of the invention. FIG. 13 is a section view of pump 624 taken generally along line 13-13 in FIG. 12. Torque converter pump assembly 610 includes shell 12 and hub 14. Shell 12 includes indents 22 for receiving pump blades 624. Tabs 634, 636, and 638 are disposed in respective indents 22. Pump assembly 610 includes core ring 26. Ring 26 includes slots 28 for receiving tabs 630 of blades 624. That is, tabs 630 extend through slots 28 and are bent, or tab-rolled, to secure blades 624 to ring 26. In an example embodiment of the invention, blades 624 may be brazed to shell 12 and/or core ring 26 for improved durability.

The following description is made with reference to FIG. 14. FIG. 14 is a partial section view of torque converter assembly 654 including pump assembly 610. Torque converter 654 includes pump assembly 610 and cover assembly 656 attached by weld 658, for example, at interface area 20. Converter 654 also includes turbine assembly 660, and clutch and damper assembly 662, disposed within the housing formed by pump assembly 610 and cover assembly 656. Turbine assembly 660 includes turbine shell 664 with slots 666 for receiving turbine blades 668.

Although certain configurations of blades 24, 124, 224, 324, 424, 524, and 624 are shown, other variations are possible. For example, the blade family may be used in torque converter turbine assembly 660 in the same manner as described for pump assembly 610, although indents 22 may be replaced with slots 666 in turbine shell 664. In an example embodiment of the invention, blades 124, 224, 324, 424, 524 and/or 624 may be used in turbine assembly 660 to improve efficiency of torque converter 654.

Pump assemblies 10 and 610, and turbine assembly 654, may include different numbers of blades or a mix of any of the blades from the blade families. Therefore, it should be appreciated that any of blades 24, 124, 224, 324, 424, 524, 624, or combinations thereof could be secured to shell 12 about hub 14 by use of indents 22 and ring 26, as generally described above. Otherwise stated, a single pump or turbine assembly may contain more than one blade selected from the blade family. As can be appreciated, the variations for the blade families allow use of the same forming tooling and mating parts. For example, assemblies 10 and 610 can use the same shell 12 and core ring 26 because the form of the blade and location of the tabs is consistent throughout the family.

Figure 15:
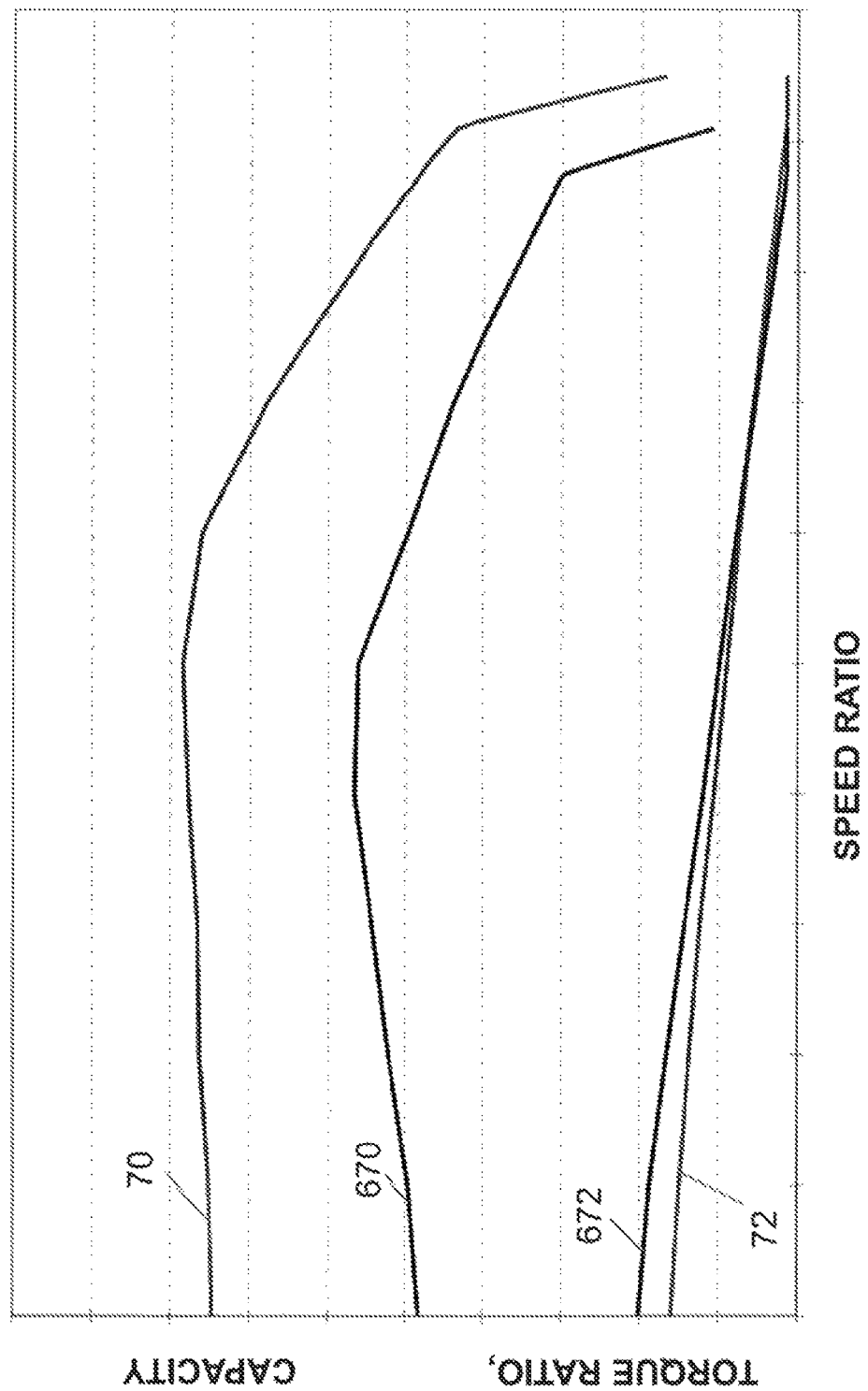
FIG. 15 is a graphical performance comparison of two torque converters according to an example aspect of the invention.

The following description is made with reference to FIG. 15. FIG. 15 is a graphical performance comparison of two torque converters according to an example aspect of the invention. Torque converter performance is often measured by capacity and torque ratio. Capacity is the maximum amount of torque the pump can introduce into the system at a given pump speed. Torque ratio is the ratio of turbine (or output) torque to pump (or input) torque. Both characteristics are plotted against speed ratio, or the ratio of turbine speed to pump speed.

Line 70 is a measured capacity curve for a torque converter having pump assembly 10. Similarly, line 670 is a measured capacity curve for a torque converter having pump assembly 610. A comparison of curves 70 and 670 shows less capacity for the torque converter with pump assembly 610. Line 72 is a measured torque ratio curve for a torque converter having pump assembly 10. Similarly, line 672 is a measured torque ratio curve for a torque converter having pump assembly 610. A comparison of curves 72 and 672 shows increased torque ratio for the torque converter with pump assembly 610. A torque converter family with different torque ratios and capacities may be desirable for a transmission used with various size engines. For example, increased capacity may be better for a larger engine, while increased torque ratio improves performance of a vehicle with a smaller engine.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A blade family for torque converters comprising:
   a first blade having a first shape and flow guiding surface; and,
   a second blade having a second shape and flow guiding surface, wherein:
      the first surface is different from the second surface; and,
         the first shape is the same as a portion of the second shape; or,
         the second shape is the same as a portion of the first shape;
   wherein the first blade is positioned in a different torque converter shell than the second blade; and,
   wherein at least one of the first or second blades includes holes or slots; or,
   wherein the first and second blades further comprise respective mounting tabs, and the second blade comprises fewer mounting tabs than the first blade.

2. The blade family of claim 1, wherein the first blade includes more material than the second blade.

3. A torque converter comprising a plurality of first blades and/or second blades according to claim 1.

4. A pair of blades for torque converters comprising:
   a first blade with a first form shape; and,
   a second blade with a second form shape substantially identical to a portion of the first form shape, wherein the first blade extends a first radial distance along an inner surface of a first shell and the second blade extends a second radial distance along an inner surface of a second shell, and wherein the first radial distance is less than the second radial distance.

5. A method of fabricating a blade for a torque converter comprising:
   cutting a blank for the blade; and
   forming the blade with a forming die, wherein:
      the forming die is a forming die for another blade; and,
      the blank is different than the blank for the other blade.

6. The method of claim 5 wherein cutting a blank for the blade includes cutting holes or slots.

7. The method of claim 5 wherein the blank for the blade includes less material than the blank for the other blade.

8. The method of claim 5 wherein the blank and the other blank include mounting tabs, and the blank includes fewer mounting tabs than the other blank.

9. The method of claim 8, further comprising installing the blade into a pump shell or turbine shell by installing the mounting tabs into corresponding indents or slots in the pump shell or turbine shell.

10. The method of claim 8, further comprising installing a plurality of blades and other blades into a pump shell or turbine shell by installing the blade mounting tabs and the other blade mounting tabs into corresponding indents or slots in the pump or turbine shell.

11. The method of claim 5 wherein the blade and the other blade are members of a blade family.

\* \* \* \* \*